P. GALLAGHER.
Fire-Escape.
No. 221,045. Patented Oct. 28, 1879.
Fig. 1.
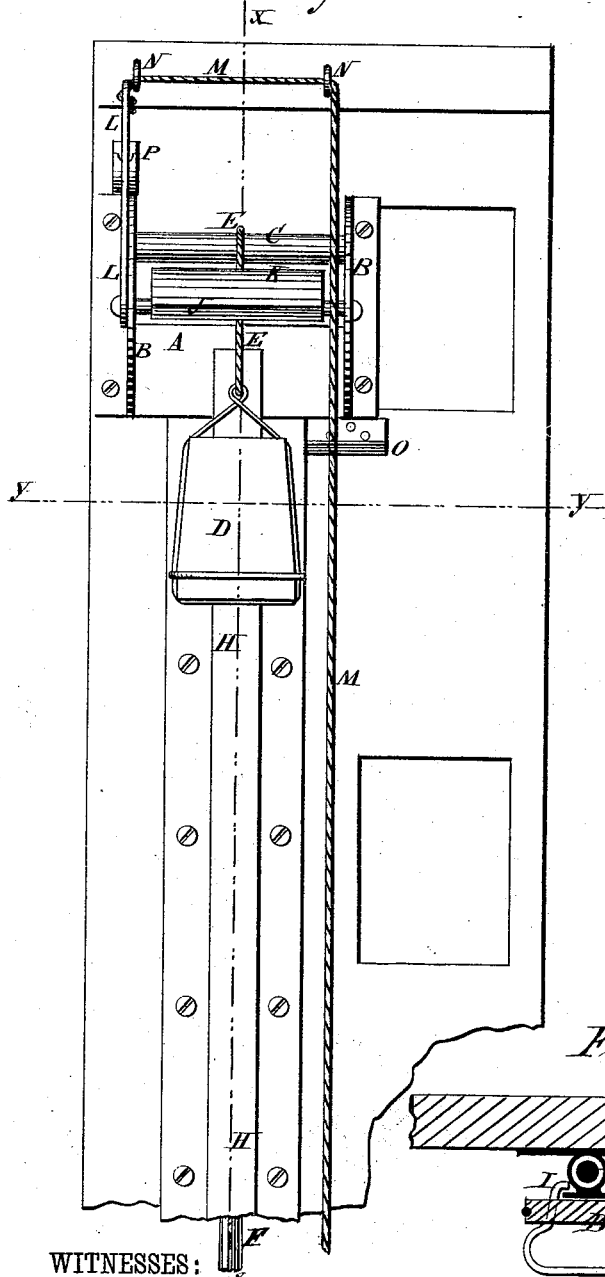
Fig. 2.
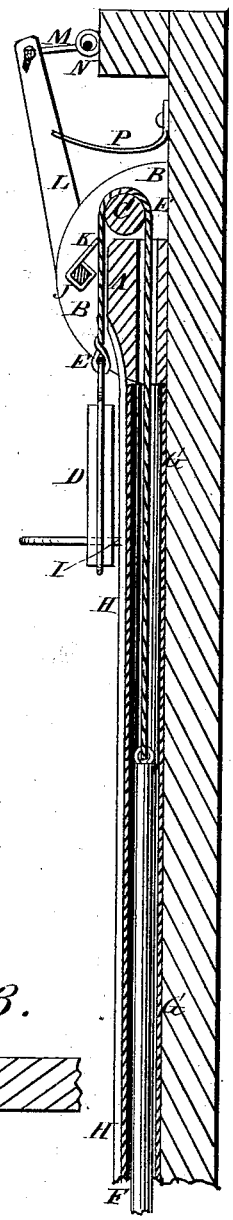
Fig. 3.
WITNESSES:
Achilles Schehl.
C. Sedgwick.
INVENTOR:
P. Gallagher
BY Munn & Co
ATTORNEYS.

UNITED STATES PATENT OFFICE.

PATRICK GALLAGHER, OF EUREKA, NEVADA, ASSIGNOR TO HIMSELF AND WILLIAM PHELPS HASKELL, OF SAME PLACE.

IMPROVEMENT IN FIRE-ESCAPES.

Specification forming part of Letters Patent No. 221,045, dated October 28, 1879; application filed June 25, 1879.

*To all whom it may concern:*

Be it known that I, PATRICK GALLAGHER, of Eureka, in the county of Eureka and State of Nevada, have invented a new and useful Improvement in Fire-Escapes, of which the following is a specification.

Figure 1 is a front view of my improved fire-escape. Fig. 2 is a vertical longitudinal section of the same, taken through the line $x\,x$, Fig. 1. Fig. 3 is a cross-section of the same, taken through the line $y\,y$, Fig. 1.

Similar letters of reference indicate corresponding parts.

The object of this invention is to furnish an improved fire-escape for attachment to buildings, which shall be so constructed that people can readily escape from the upper stories of burning buildings when the stairways may be rendered impassable by the fire, and which shall be simple in construction, easily operated, and convenient and reliable in use.

The invention consists in the combination of the block, the roller, the cage, the chain and weight, the guard, the flanged brake-shaft, the lever and spring, and the brake-chain with each other to adapt the device for attachment to the side of a building, as hereinafter fully described.

A represents a block, which is designed to be attached to the upper part of a side of the building at the side of or a little above one of the windows of the upper story. To the ends of the block A are attached, or upon them are formed, plates or frames B, to the upper parts of which, just above the upper edge of the block A, are pivoted the ends of a roller, C.

D represents the cage in which the people escape from the building, which may be made of any desired size or shape, and which is attached to the end of a chain, E. The chain E passes up across the face of the block A, over the roller C, down through a hole or opening in the rear side of the said block A, and to its other end is attached a weight, F, of sufficient size to carry the cage D up when empty.

The weight F slides up and down through a guide tube or case, G, attached to the side of the building, and to which is attached, or upon which is formed, a plate, H, the edges of which project to receive guard-arms I, attached to the cage D, and keep the said cage in place as it moves up and down, and to prevent it from tipping should its load be unevenly balanced.

To the plates or frames B in front of the upper part of the block A are pivoted the ends of a shaft, J, which is provided with a flange, K, to bear against the chain E and press it into the space between the block A and the roller C, to serve as a brake for controlling the rapidity of descent of the cage D.

To one of the journals of the brake-shaft J is rigidly attached the end of a lever, L, which projects outward and upward, and has the end of a chain, M, attached to its upper end. The chain M passes through guide-eyes N, or around guide-pulleys attached to the side of the building. The chain M passes down at the side of the window and extends to the ground.

O is a platform secured to the side of the building just below the window for convenience in passing from the said window to the cage D.

If desired, the platform O may be secured to the corner of the cage D, so that it may always be ready for use at whatever story the said cage may be stopped, and so that it may not be necessary to attach a platform to the side of the building at each story.

P is a spring interposed between the lever L and the side of the building to push the said lever L outward and withdraw the brake from the chain E when the strain upon the chain M is relaxed.

The lever L should also be provided with a stop to prevent it from being pushed too far back by the spring P.

With this construction the cage D can be stopped at any desired point, so as to receive people from any story of the building, and when the cage D has reached the ground and has been unloaded the operator, by retaining hold of the chain M, can readily control its ascent and stop it at any desired story.

I am aware that a car has been adapted to be lowered from the window of a building by means of cords or chains passed over pulleys and provided with weights; also, that a platform has been arranged to move in ways, being counterbalanced by weights and provided with brakes.

Having thus described my invention, I claim—

The combination of the block A, the roller C, the cage D, the chain and weight E F, the guard H I, the flanged brake-shaft J K, the lever and spring L P, and the brake-chain M with each other to adapt the device for attachment to the side of a building, substantially as herein shown and described.

PATRICK GALLAGHER.

Witnesses:
ABRAM BOLAND,
ALEX. HIGH,
GEO. R. AMMOND.